United States Patent
Meis et al.

(10) Patent No.: US 7,130,498 B2
(45) Date of Patent: Oct. 31, 2006

(54) MULTI-LAYER OPTICAL CIRCUIT AND METHOD FOR MAKING

(75) Inventors: Michael A. Meis, Stillwater, MN (US); Nicholas A. Lee, Woodbury, MN (US); Gordon D. Henson, Lake Elmo, MN (US); Luke Carlson, Minneapolis, MN (US)

(73) Assignee: 3M Innovative Properties Company, St. Paul, MN (US)

(*) Notice: Subject to any disclaimer, the term of this patent is extended or adjusted under 35 U.S.C. 154(b) by 413 days.

(21) Appl. No.: 10/687,442

(22) Filed: Oct. 16, 2003

(65) Prior Publication Data

US 2005/0084200 A1    Apr. 21, 2005

(51) Int. Cl.
    *G02B 6/12*    (2006.01)
(52) U.S. Cl. .................... 385/14; 398/43; 385/50; 385/147
(58) Field of Classification Search ............ 385/54–56, 385/76–77, 88–93, 100, 114, 136, 137, 147, 385/14, 120
    See application file for complete search history.

(56) References Cited

U.S. PATENT DOCUMENTS

| | | |
|---|---|---|
| 4,005,312 A | 1/1977 | Lemelson |
| 4,138,193 A | 2/1979 | Olszewski et al. |
| 4,307,386 A | 12/1981 | Bridge |
| 4,529,645 A | 7/1985 | Berg et al. |
| 4,597,030 A | 6/1986 | Brody et al. |
| 4,650,704 A | 3/1987 | Rothenberg |
| 4,783,354 A | 11/1988 | Fagan |
| 4,847,596 A | 7/1989 | Jacobson et al. |
| 4,972,050 A | 11/1990 | Hammond et al. |
| 5,046,800 A | 9/1991 | Blyler, Jr. et al. |
| 5,054,870 A | 10/1991 | Lösch et al. |
| 5,076,881 A | 12/1991 | Ferguson |
| 5,134,470 A | 7/1992 | Ravetti |
| 5,155,785 A | 10/1992 | Holland et al. |
| 5,160,569 A | 11/1992 | Ott et al. |
| 5,170,448 A | 12/1992 | Ackley et al. |
| 5,204,925 A * | 4/1993 | Bonanni et al. ............ 385/89 |
| 5,220,628 A | 6/1993 | Delbare et al. |
| 5,226,105 A | 7/1993 | Myers |
| 5,247,596 A | 9/1993 | Maignan et al. |
| 5,259,051 A | 11/1993 | Burack et al. |
| 5,292,390 A | 3/1994 | Burack et al. |
| 5,296,277 A | 3/1994 | Wilson et al. |
| 5,327,513 A | 7/1994 | Nguyen et al. |
| 5,362,516 A | 11/1994 | Wilson et al. |

(Continued)

FOREIGN PATENT DOCUMENTS

EP    0 587 336 A2    3/1994

(Continued)

OTHER PUBLICATIONS

Holland, W.R., et al; "Optical Fiber Circuits", *Electronic Components and Technology Conference, 1993 Proceedings* (Jun. 1, 1993); IEEE, New York, NY; ISBN 0780307941; pp. 711-717.

(Continued)

*Primary Examiner*—Akm Enayet Ullah
(74) *Attorney, Agent, or Firm*—Gregg H. Rosenblatt (57) ABSTRACT

A multi-layer optical circuit has a plurality of optical circuit layers. Each optical circuit layer is positioned on a corresponding one of a plurality of substrates. An optical fiber extends between at least two of the optical circuit layers and forms a portion of the at least two of the plurality of optical circuit layers.

23 Claims, 10 Drawing Sheets

U.S. PATENT DOCUMENTS

| | | | |
|---|---|---|---|
| 5,381,504 A | 1/1995 | Novack et al. | |
| 5,394,504 A | 2/1995 | Burack et al. | |
| 5,408,351 A * | 4/1995 | Huang | 398/191 |
| 5,416,870 A | 5/1995 | Chun et al. | |
| 5,449,540 A | 9/1995 | Calhoun et al. | |
| 5,513,293 A | 4/1996 | Holland et al. | |
| 5,521,992 A | 5/1996 | Chun et al. | |
| 5,582,673 A | 12/1996 | Burack et al. | |
| 5,611,017 A | 3/1997 | Lee et al. | |
| 5,676,787 A | 10/1997 | Rusincovitch et al. | |
| 5,689,604 A | 11/1997 | Janus et al. | |
| 5,694,511 A | 12/1997 | Pimpinella et al. | |
| 5,724,468 A | 3/1998 | Leone et al. | |
| 5,784,516 A | 7/1998 | Parzygnat et al. | |
| 5,790,738 A | 8/1998 | Parzygnat | |
| 5,793,909 A | 8/1998 | Leone et al. | |
| 5,835,646 A | 11/1998 | Yoshimura et al. | |
| 5,838,845 A | 11/1998 | Leone et al. | |
| 5,902,435 A | 5/1999 | Meis et al. | |
| 6,005,991 A | 12/1999 | Knasel | |
| 6,352,374 B1 * | 3/2002 | Selfridge et al. | 385/76 |
| 6,390,690 B1 | 5/2002 | Meis et al. | |
| 6,427,034 B1 | 7/2002 | Meis et al. | |
| 6,834,132 B1 * | 12/2004 | Kondo et al. | 385/14 |
| 6,922,510 B1 * | 7/2005 | Hatanaka | 385/50 |
| 2002/0181855 A1 * | 12/2002 | Xue et al. | 385/23 |
| 2003/0007773 A1 | 1/2003 | Kondo et al. | |
| 2004/0018017 A1 * | 1/2004 | Hatayama | 398/43 |
| 2004/0086255 A1 | 5/2004 | Botet et al. | |
| 2004/0114902 A1 | 6/2004 | Simmons et al. | |
| 2004/0169645 A1 * | 9/2004 | Sakaki | 345/204 |
| 2005/0087438 A1 * | 4/2005 | Heston | 204/192.38 |
| 2005/0226614 A1 * | 10/2005 | Ogiwara et al. | 398/37 |

FOREIGN PATENT DOCUMENTS

| | | |
|---|---|---|
| EP | 0 816 882 A3 | 6/1999 |
| EP | 1 146 372 A2 | 10/2001 |
| EP | 1 146 372 A3 | 10/2001 |
| EP | 1 162 487 A2 | 12/2001 |
| EP | 1 162 487 A3 | 12/2001 |
| FR | 2 574 562 | 6/1986 |
| JP | HEI 8-151755 | 6/1996 |

OTHER PUBLICATIONS

M.A. Shahid et al; "Flexible Optical Backplane Interconnections", *IEEE Proceedings of MPPOI '96* (1996); 0-8186-7591-Aug. 1996; pp. 178-185.

\* cited by examiner

MULTI-LAYER OPTICAL CIRCUIT AND METHOD FOR MAKING

BACKGROUND OF THE INVENTION

The present invention generally relates to optical circuits. More particularly, the invention relates to multi-layer routed fiber optical circuits and methods for fabricating multi-layer routed fiber optical circuits.

The use of optical fibers for high-volume high-speed communication and data transfer is well established. As the volume and speed of transmitted information grows, the desire for systems using multiple optical fibers has increased. The rapid increase in communication speeds has created a demand for optical circuits to enhance or replace electrical circuits in many different applications. Optical circuits have bandwidth capabilities orders of magnitude beyond electrical circuits, and are inherently immune to electrical interference.

Fabrication of fiber-based optical circuits is known in the art. For example, it is known that optical circuits may be fabricated by positioning optical fibers in a particular pattern and adhesively bonding or embedding the fibers using pressure sensitive adhesives (PSA) or partially cured monomers coated on laminating films. The adhesive and optical fiber assembly can then be further protected by, for example, applying a cover layer, curing the adhesive, or flood coating and curing. Other optical circuits can be fabricated by patterning optical fibers on an adhesive coated film and laminating the assembly to the surface of an electrical circuit board. Still other optical circuits are constructed by embedding optical fibers or waveguides within a circuit board. In each case, the finished assembly consists of optical fibers or waveguides held firmly in place in an intermediate layer of a multi-layer assembly.

When fabricating optical circuits, especially those which consist of optical fibers laminated between two flexible substrates (commonly referred to as "flex foils"), it is customary to generate the desired circuit pattern in a single layer. In the event that a large number of circuit lines are required, and when the circuit layout permits, a higher density design may be achieved by stacking two or more flex foils into a single lamination, thereby forming a multi-layer optical circuit. However, when the circuit layout becomes very complex, it becomes more difficult to fabricate a circuit in multiple layers by simply stacking discreet circuits for a number of reasons. Specifically, it is likely that the circuit design will require fibers from one layer of the circuit to be routed with fibers on another layer of the circuit. It is also possible that fibers from multiple layers will need to terminate into a single connector. It may also be required that fiber lengths be optimized to minimize skew between channels; such length optimization in a high density interconnect design with adjacent connectors positioned very close together may make it very difficult or impossible to equalize lengths on a single layer.

There are other problems associated with positioning optical fibers or waveguides in an intermediate layer of a multi-layer assembly. For example, terminating optical fibers or waveguides positioned in an intermediate layer of a multi-layer assembly can be problematic, as the optical fibers or waveguides are not readily accessible for connector mounting and polishing. Interlayer optical coupling is also difficult, because each optical circuit layer is independently formed prior to lamination. The optical circuit designer must therefore resort to exotic measures to couple light into and out of waveguides or optical fibers buried in an inner board layer. Light coupling generally involves directing light into the board at an angle orthogonal to the surface of the board, and then somehow turning the light 90 degrees and coupling into the waveguide. Light coupling measures require the use of angled waveguides, inclusive of mirrors, lenses, etc. Such assemblies are difficult to assemble, increase costs, and usually increase signal loss in the device.

Still other problems associated with positioning optical fibers or waveguides in an intermediate layer of a multi-layer assembly include, for example, microbending stresses and associated optical losses that occur as the circuit layers are laminated together and optical fibers cross over each other due to requirements of the circuit pattern. Also, fibers rigidly held in such optical circuit assemblies may exhibit increased bending loss caused by temperature-induced stress.

SUMMARY

The present invention provides a multiple layer optical circuit and a method for fabricating multiple layer optical circuits in a single operation.

In one embodiment according to the invention, a multi-layer optical circuit comprises a plurality of optical circuit layers. Each optical circuit layer is positioned on a corresponding substrate. An optical fiber extends between at least two optical circuit layers and forms a portion of the at least two optical circuit layers.

In another embodiment according to the invention, an optical circuit comprises a first optical circuit layer disposed on a first substrate portion and a second optical circuit layer disposed on a second substrate portion. An optical fiber of the circuit layers extends continuously between the first and second optical circuit layers.

In yet another embodiment according to the invention, an optical circuit comprises a first circuit layer and a second circuit layer stacked on the first circuit layer. An interlayer bus extends between the first and second circuit layers and forms an integral portion of the first and second circuit layers.

One embodiment of a multilayer optical circuit according to the invention is formed by patterning optical fibers to create a first layer of the optical circuit on a first substrate, and then patterning optical fibers to create a second layer of the optical circuit on a second substrate. At least one optical fiber is integral with the first and second layer and extends between the first layer and the second layer. The first and second substrates are then positioned in a layered arrangement.

Another embodiment of a three-dimensional optical circuit according to the invention is formed by arranging a plurality of optical fibers to create an optical circuit, and securing the ends of the plurality of optical fibers so as to leave the optical fibers unattached along their lengths. After the ends of the optical fibers are secured, the secured ends are moved to predetermined positions within a three-dimensional volume. Yet another embodiment of a multi-layer optical circuit according to the invention is formed by patterning first and second optical circuits on first and second substrates. The first and second circuits include a common optical fiber. The first and second substrates are positioned in a stacked arrangement by bending, folding, twisting or rotating the first and second substrates relative to each other.

BRIEF DESCRIPTION OF THE DRAWINGS

FIGS. 10A–10C schematically illustrate one embodiment of a multi-layer opto-electric circuit according to the invention, where

DETAILED DESCRIPTION

In the following Detailed Description, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

During fabrication of the multi-layer optical circuit embodiments according to the present invention, optical fibers of each of the individual multiple circuit layers are initially laid out in a continuous single-layer (i.e., two-dimensional) pattern. Within the continuous single-layer pattern of optical fibers, the desired fiber routing geometry for each of the individual optical circuit layers is established, as is the desired routing of optical fibers between what will become different layers of the multiple layers. After the continuous single-layer pattern is complete, the individual circuit layer portions of the continuous single-layer pattern are manipulated (such as by bending, folding, twisting, etc.) such that each of the individual circuit layers are positioned in a desired layered arrangement, resulting in a multi-layer (i.e., three-dimensional) optical circuit.

Figure 1A:
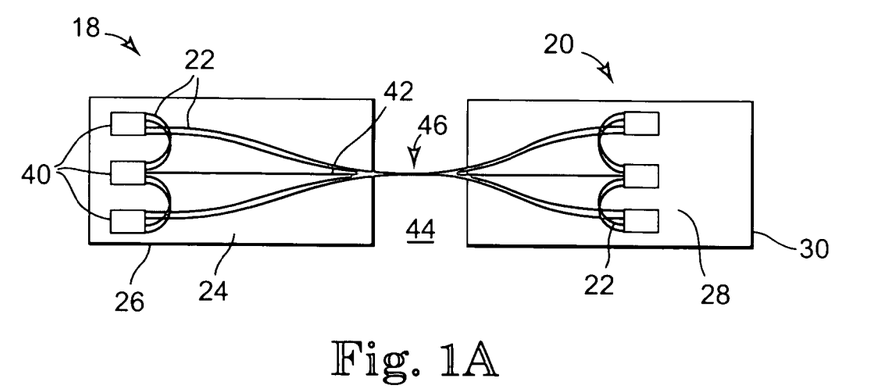
FIGS. 1A–1C schematically illustrate steps to form one embodiment of a multi-layer optical circuit according to the invention.
Figure 1B:
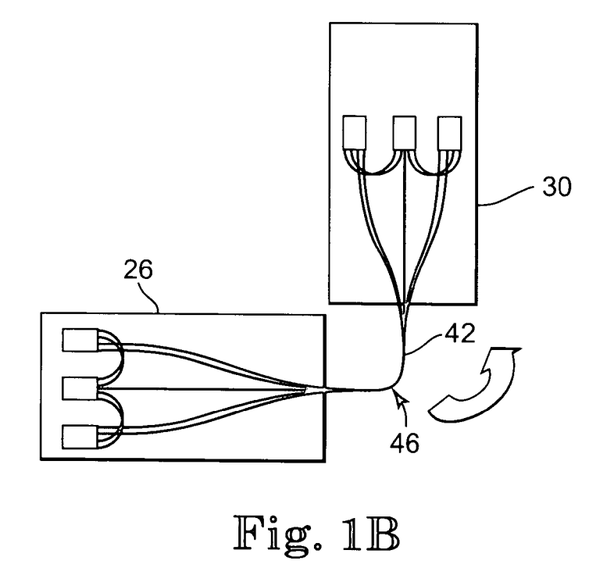
Figure 1C:
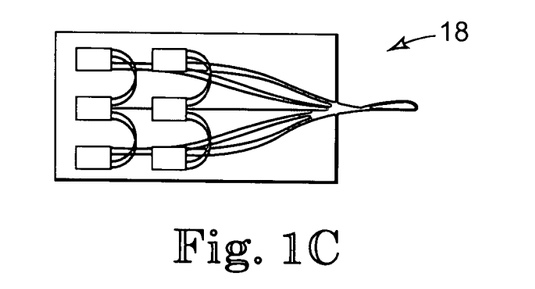

One embodiment and method for making a multi-layer optical circuit according to the invention is illustrated in FIGS. 1A–1C. In FIG. 1A, each of the layers of a multi-layer optical circuit 18 are laid out as a continuous single-layer pattern 20 of optical fibers 22. The continuous single-layer pattern 20 includes a first optical circuit layer 24 arranged in a desired pattern on a first substrate 26, and a second optical circuit layer 28 arranged in a desired pattern on a second substrate 30 adjacent to the first circuit layer 24. The first and second optical circuit layers 24, 28 may optionally include elements 40 other than optical fibers, including but not limited to opto-electronic devices, optical fiber connectors, optical switches, couplers, wavelength selective devices, etc. One or more optical fibers 42 that form a portion of the first and second optical circuit layers 24, 28 extend continuously between the first and second optical circuit layers 24, 28. These interlayer optical fibers are sometimes referred to as "interlayer buses".

In the multi-layer circuit embodiment of FIGS. 1A–1C, circuit substrates 26, 30 are prepared and positioned for each optical circuit layer 24, 28, respectively, in the region where the optical fibers will be routed, except that no such substrate material is prepared for the region 44 where the interlayer buses 42 are to be routed. The interlayer buses 42 are patterned to run between the adjacent circuit substrates 26, 30 and their associated optical circuits. The interlayer buses 42 are routed such that the fibers are free to equilibrate bending forces when the first and second substrate portions 26, 30 are rotated relative to each other, as described below. In the exemplary embodiment of FIGS. 1A–1C, the interlayer buses 42 form a parallel ribbon portion 46, with the plane of the parallel ribbon portion 46 perpendicular to the plane of the circuit substrates 26, 30. In alternate embodiments according to the invention, the interlayer buses 42 may be laid out in patterns other than that shown.

Figure 2A:
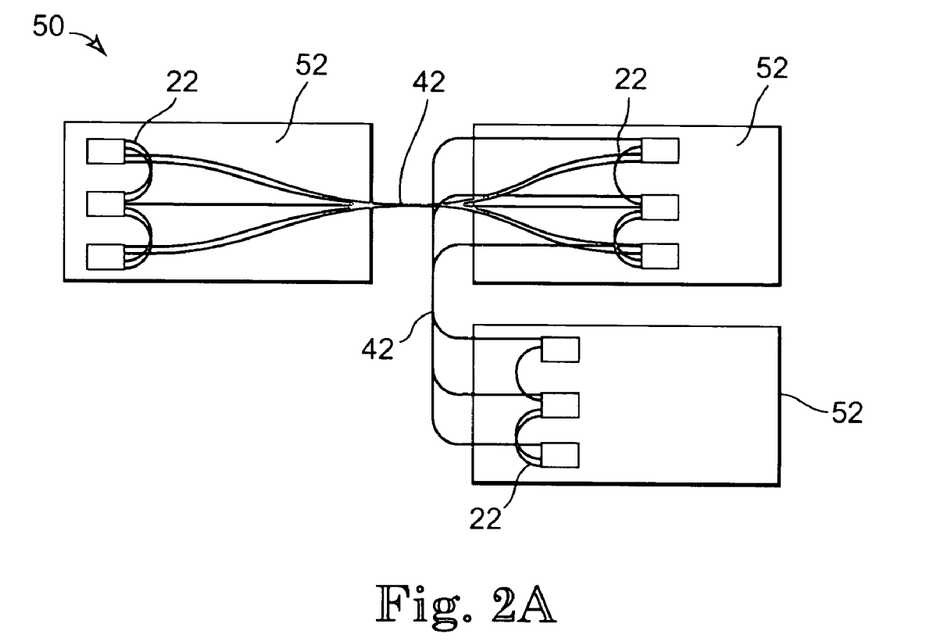
FIGS. 2A–2B schematically illustrate steps to form an alternate embodiment of a multi-layer optical circuit according to the invention.
Figure 2B:
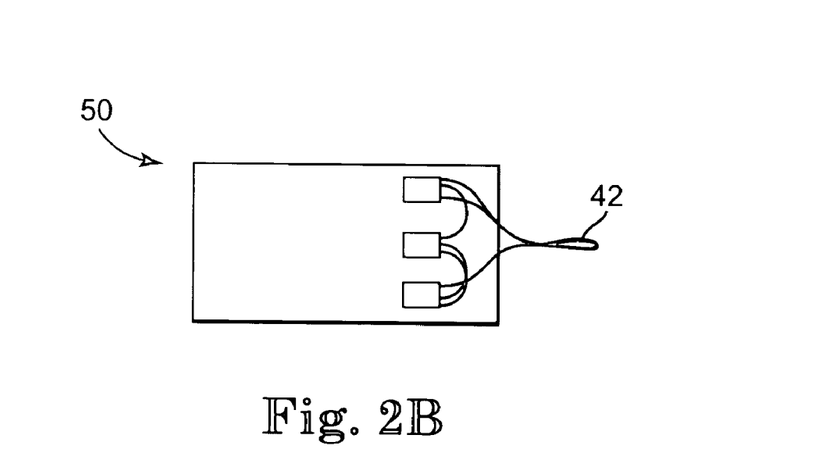

After the optical fibers 22, 42 are routed to create the desired circuit patterns for each layer 24, 28 of the multi-layer optical circuit 18, and preparations are made at the fiber termination locations, the second patterned substrate 30 (and its associated optical circuit) is rotated 180° (as illustrated in FIG. 1B) such that the second patterned substrate 30 (and its associated optical circuit) is positioned directly over the first patterned substrate 26 (and its associated optical circuit). If there are more than two optical circuit layers (as illustrated by the three-layer circuit 50 in FIGS. 2A–2B), subsequent circuit layers are also rotated, in order, to lay upon the previous circuit layer. After assembly, the interlayer buses 42 form exposed fiber loops which extend beyond the edges of the circuit substrates 26, 30. The exposed portions of the interlayer buses 42 may optionally be protected by additional laminations (not shown), if desired. The final multi-layer optical circuit 18 appears as illustrated in FIG. 1C.

It should be noted that each of the layers of the optical circuit 18 shown in FIG. 1C could alternately be designed for placement into two components of an assembly that are required to rotate relative to each other during operation.

Although FIGS. 1A–1C illustrate a multi-layer circuit 18 having two layers, any number of additional circuit layers may be provided in a similar manner. As noted above, FIGS. 2A–2B illustrate a three-layer circuit 50 prior to positioning the individual circuit substrate layers 52 upon each other (FIG. 2A) and after the substrate layers 52 have been positioned upon each other (FIG. 2B).

Figure 3A:
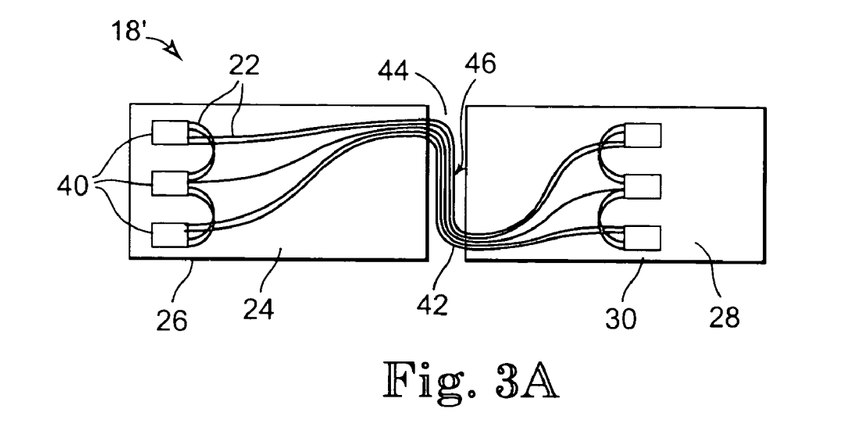
FIGS. 3A–3C schematically illustrate steps to form an alternate embodiment of a multi-layer optical circuit according to the invention.
Figure 3B:
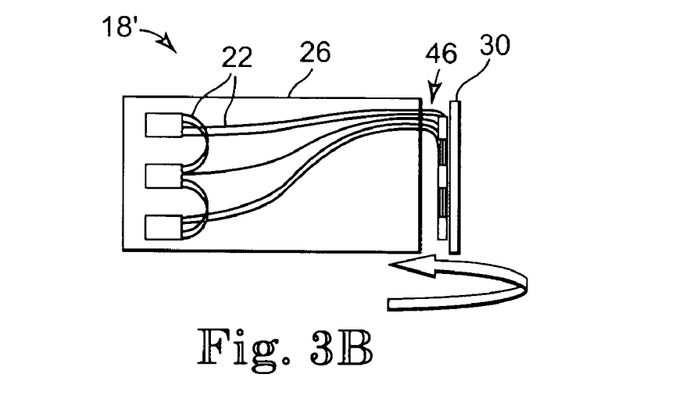
Figure 3C:
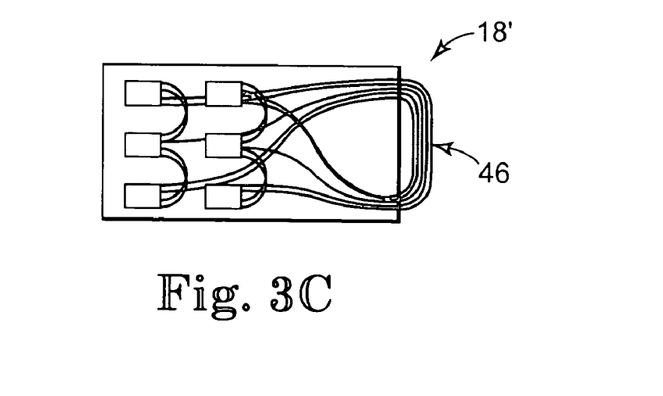

Another embodiment and method of fabricating a multi-layer optical circuit 18' according to the invention is illustrated in FIGS. 3A–3C. As shown in FIG. 3A, a first circuit layer 24 is laid out in a desired pattern on first substrate 26. A second circuit layer 28 is laid out in a similar fashion on second substrate 30. Additional circuit layers may also be included. One or more optical fibers 22 that form a portion of the optical circuit layers 24, 28 extend continuously between the optical circuit layers 24, 28 to provide interlayer buses 42.

In the illustrated embodiment, the circuit substrates 26, 30 are prepared and positioned for each optical circuit layer 24, 28 in the region where the optical fibers will be routed, except that no such substrate material is prepared for the regions 44 where the interlayer buses 42 are to be routed. The interlayer buses 42 are patterned to run between the adjacent circuit substrates 28, 30 and their associated optical circuits. The interlayer buses 42 are routed such that the fibers are free to equilibrate bending forces when the first and second substrate portions 26, 30 are folded relative to each other, as described below. In the exemplary embodiment of FIGS. 3A–3C, the interlayer buses 42 are patterned to create a parallel ribbon portion 46 between the adjacent circuit layer substrates 26, 30. The plane of the parallel ribbon portion 46 is parallel to the plane of the adjacent circuit substrates 26, 30 (as shown in FIG. 3A). In alternate embodiments according to the invention, the interlayer buses 42 may be laid out in patterns other than that illustrated.

After the optical circuit designs are laid out on the circuit substrates 26, 30, the second circuit substrate 30 is folded along the parallel fiber ribbon portion 46, until the second circuit substrate layer 30 is positioned upon the first circuit substrate layer 26. The resulting multi-layer circuit assembly 18' appears as shown in FIG. 3C.

It should be noted that in an alternate embodiment according to the invention, the layers 24, 28 of the optical circuit shown in FIG. 3A could be designed for placement into two components of an assembly that are required to fold relative to each other during operation.

Figure 4:
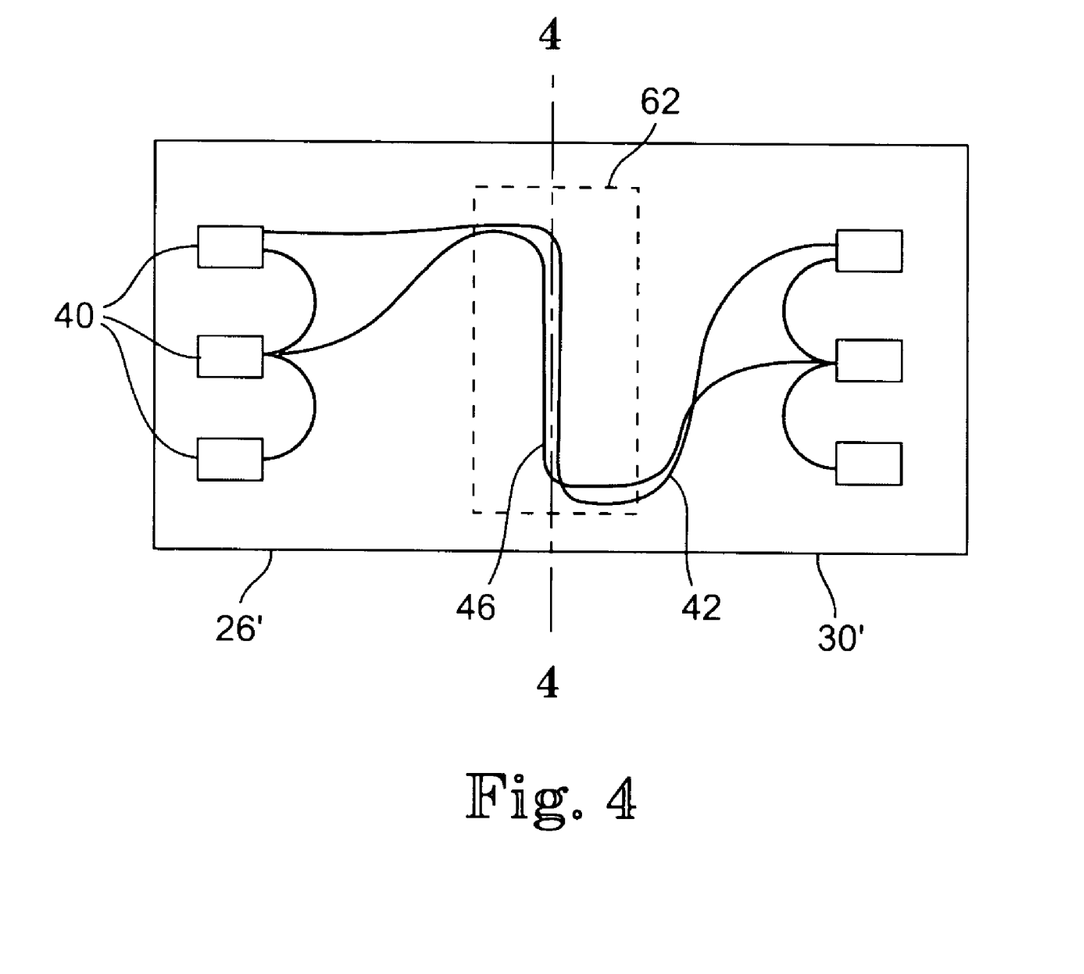
FIG. 4 schematically illustrates a substrate configuration used in an alternate embodiment of a multi-layer optical circuit according to the invention.

As shown in FIG. 4 in an alternate embodiment according to the invention, the circuit substrate portions 26', 30' supporting the first and second optical circuit layers 24, 28 need not be completely physically separated from each other, and may be, for example, joined at least partially. For example, as illustrated by dashed lines in FIG. 4, the area between first substrate portion 26' and second substrate portion 30' (where interlayer busses 42 are routed) may be a window 62 in the substrate. Alternately, no window 62 or opening is provided at all, and the interlayer busses 42 are routed such that they are positioned in the "crease" that is formed when first and second substrate portions 26', 30' are folded relative to each other along line 4—4. Alternately, no window 62 or opening is provided and the interlayer buses 42 are routed such that they are positioned in an adhesive-free area such that the fibers are free to equilibrate bending forces when the first and second substrate portions 26', 30' are folded relative to each other along line 4—4.

Figure 5:
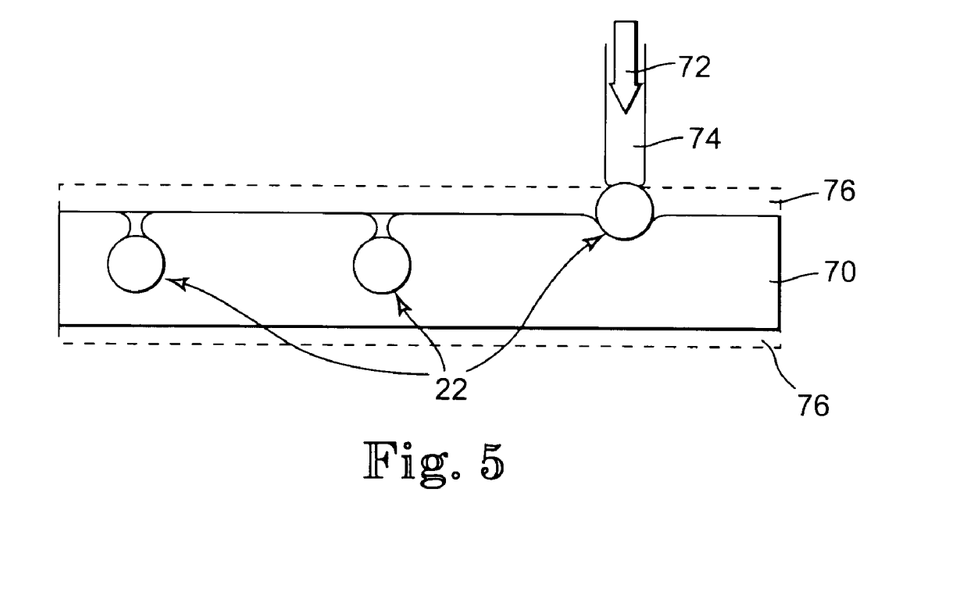
FIG. 5 schematically illustrates a cross-section of an embodiment of a single layer of an optical circuit according to the invention.

In one embodiment according to the invention, schematically illustrated in FIG. 5, the optical fibers 22 of the optical circuits 18, 18' illustrated in FIGS. 1A–4, are routed in the desired circuit pattern in a tacky adhesive coating or film 70 that comprises or forms a portion of substrates 26/26', 30/30', such as ultraviolet-initiated structural bonding film, available from 3M Company of Saint Paul, Minn., U.S.A. under the product designation NPE-DSD97A, or a similar material. The adhesive film 70 is available or can be produced in a thickness sufficient so that fibers 22 can be completely embedded into the adhesive 70, such as by pressing fibers 22 into adhesive 70 in the direction of arrow 72 using an embedding tool 74. Upon completion of the optical fiber 22 placement, the adhesive film 70 is irradiated with UV light sufficient to initiate curing of the adhesive. Upon completion of the curing process, the adhesive film 70 is no longer tacky, and the single-layer portion of the optical circuit construction is complete. If desired, additional layers of protective film 76 may be laminated on one or both sides of the circuit substrates.

Figure 6:
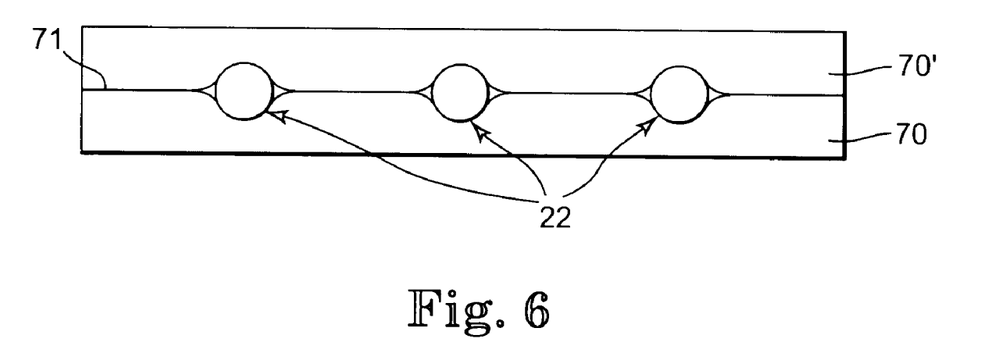
FIG. 6 schematically illustrates a cross-section of another embodiment of a single layer of an optical circuit according to the invention.

In an alternate embodiment according to the invention, schematically illustrated in FIG. 6, the fiber 22 pattern is routed into a surface 71 of an adhesive film 70 in the desired pattern, and upon completion of patterning, a second layer of adhesive film 70' is laminated on to the surface 71 so as to embed or encapsulate the fibers 22 within the now homogenous adhesive layers 70, 70'. The adhesive films 70, 70' can be irradiated with UV light to initiate curing of the adhesive.

Figure 7:
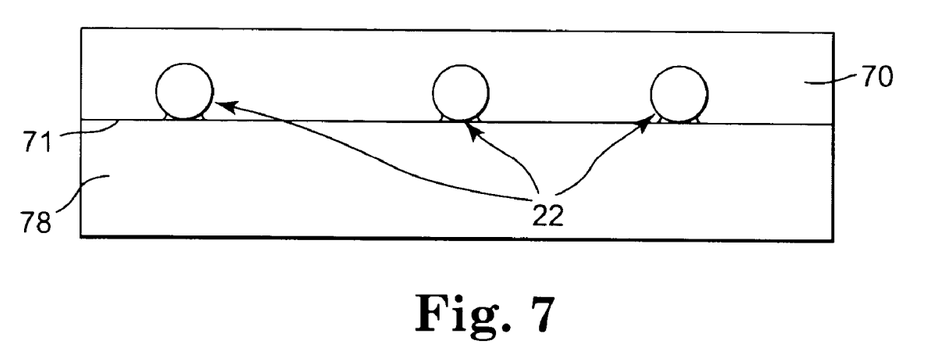
FIG. 7 schematically illustrates a cross-section of another embodiment of a single layer of an optical circuit according to the invention.

In an alternate embodiment according to the invention, schematically illustrated in FIG. 7, the fiber 22 pattern is routed onto a surface 71 of an adhesive film 70 in a mirror image of the desired pattern, and upon completion of patterning, the surface 71 of the adhesive film 70 is irradiated with UV light to initiate curing. The routed optical fibers 22 and adhesive 70 are then inverted and pressed onto a suitable substrate 78, such as a printed circuit board assembly. By pressing the optical fiber 22 and adhesive 70 onto the substrate 78, the optical fibers 22 are further embedded into the adhesive 70, thus assuring maximum bonding strength between the optical fibers 22 and the adhesive 70. Upon subsequent completion of the adhesive curing process, the routed circuit assembly is an integral part of the circuit board assembly.

Figure 8:
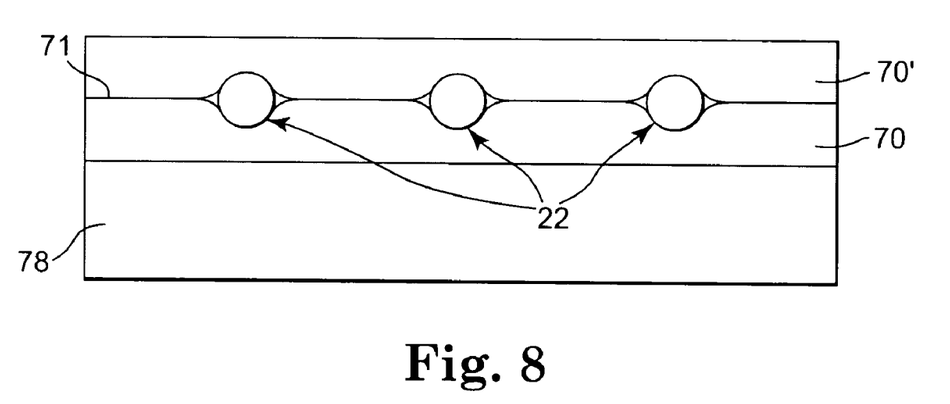
FIG. 8 schematically illustrates a cross-section of another embodiment of a single layer of an optical circuit according to the invention.

In an alternate embodiment according to the invention, schematically illustrated in FIG. 8, the fiber pattern is routed onto a surface 71 of an adhesive film 70 in a direct image of the desired pattern, and upon completion of patterning, a second layer 70' of adhesive film is laminated onto the surface 71, thereby embedding or encapsulating the optical fibers 22 within the now homogenous adhesive layers 70, 70'. The adhesive films 70, 70' are irradiated with UV light to initiate curing. The routed fibers 22 and adhesive film 70, 70' are then pressed onto a suitable substrate 78 such as a printed circuit board assembly. By pressing the routed fiber and adhesive construction onto the printed circuit board substrate, the fibers 22 will become further embedded into the adhesive 70, 70', thus assuring maximum boding strength between the fibers 22 and the adhesive 70, 70'. Upon subsequent completion of the curing process the routed circuit is an integral part of the circuit board assembly.

Figure 9:
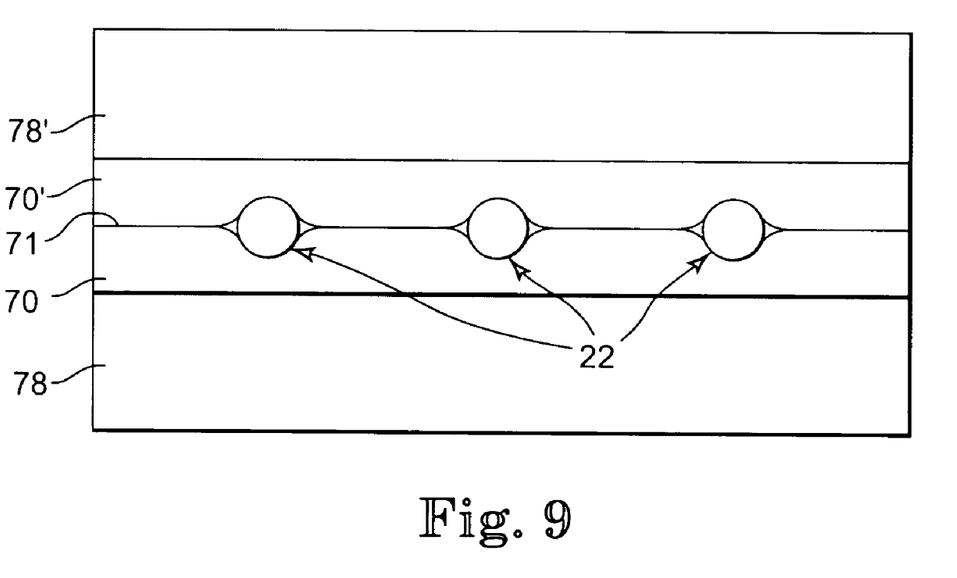
FIG. 9 schematically illustrates a cross-section of another embodiment of a single layer of an optical circuit according to the invention.

In an alternate embodiment according to the invention, schematically illustrated in FIG. 9, the fiber 22 pattern is routed onto the surface 71 of an adhesive film 70 in the desired pattern, and upon completion of patterning, a second layer of adhesive film 70' is laminated onto the surface 71, thus embedding or encapsulating the fibers 22 within the now homogenous adhesive layers 70, 70'. The adhesive films 70, 70' are irradiated with UV light to initiate curing of the adhesive. The routed fiber and adhesive construction is then pressed onto a suitable substrate 78, such as a printed circuit board assembly. By pressing the routed fiber and adhesive construction onto the surface of the substrate 78, the optical fibers 22 become further embedded into the adhesive 70, 70', thus assuring maximum bonding strength between the fibers 22 and the adhesive 70, 70'. A second substrate 78', such as a second printed circuit board assembly, is pressed on the adhesive opposite substrate 78, thus creating a multi-layer printed circuit board assembly. Upon subsequent completion of the curing process, which can occur even with the optical circuit laminated between two printed, wiring board assemblies, the routed circuit is an integral part of the multi-layer circuit board assembly.

Figure 10A:
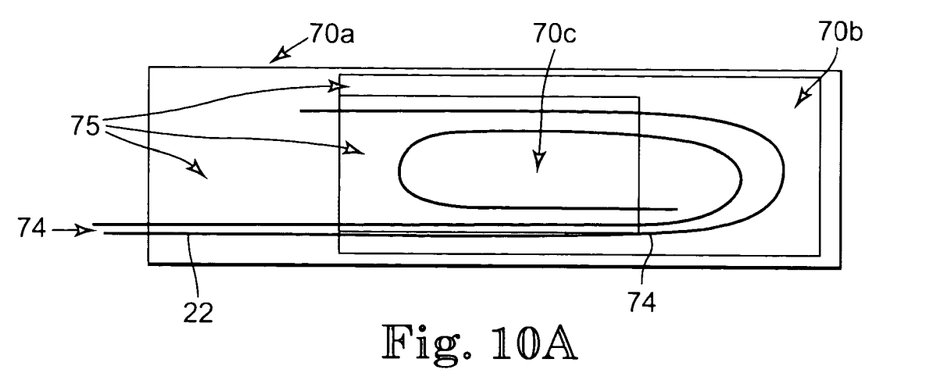
FIG. 10A illustrates a top view of multiple optical circuit layers.
Figure 10B:
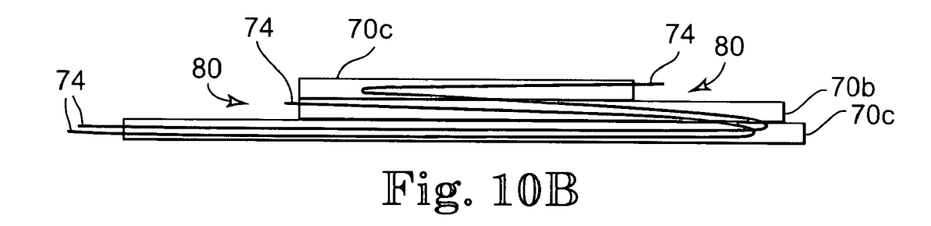
FIG. 10B illustrates a side view of the optical circuit of FIG. 10A.
Figure 10C:
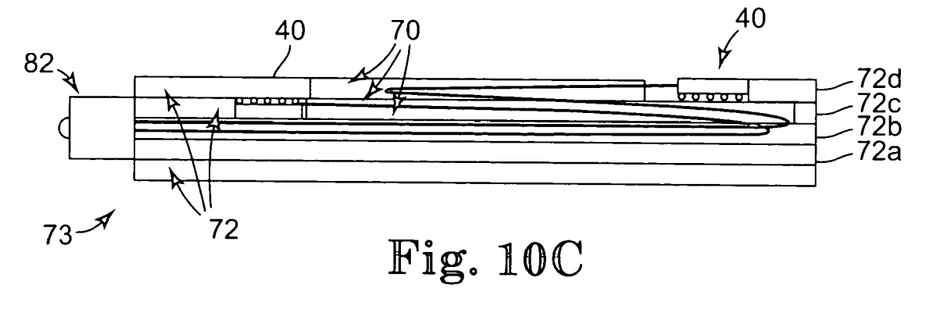
FIG. 10C illustrates the optical circuit of FIG. 10A incorporated into a multi-layer opto-electric circuit.

FIGS. 10A–10C illustrate another embodiment of a multi-layer circuit according to the invention, utilizing multiple circuit layers, including optical layers 70a, 70b, 70c (collectively referred to as optical layers 70) and electrical layers 72a, 72b, 72c, 72d (collectively referred to as electrical layers 72) to create a multi-layer three-dimensional opto-electric circuit 73. Optical fibers 22 are routed in a desired pattern onto a substrate 75 (an adhesive layer, for example) in a manner consistent with that described above with reference to FIGS. 1A–9. To aid in the construction of the assembly, the adhesive could be, for example, ultraviolet-initiated structural bonding film, such as that available from 3M Company of Saint Paul, Minn., USA under the product designation NPE-DSD97A, or a similar material. The optical layers 70 may be assembled into a multi-layer assembly by rotating, twisting, bending, or folding the layers 70 relative to each other as shown in FIGS. 1A–4.

A close examination of the geometry of the multiple optical circuit layers 70 of FIGS. 10A–10C reveals that the ends 74 of optical fibers that originate on one circuit layer 70 and terminate on another circuit layer 70 (i.e., the fibers that form the interlayer busses) will be at different elevations of the finished multi-layer optical circuit 18". By constructing numerous circuit layers 70 with fibers 22 routed between the various layers 70, a complex three dimensional optical circuit can be created. By careful construction of the optical layers 70, a three dimensional topography of optical fiber 74 ends can result, with the optical fiber ends 74 appearing at predetermined locations and elevations within the multi-layer opto-electric circuit 73.

In assembling a multi-layer opto-electric circuit 73 as shown in FIGS. 10A–10C, electrical circuit board layers 72 in the construction can provide access to the optical fiber ends 74 by providing void areas 80 (FIG. 10B) where the optical fiber ends 74 on a given layer 70 of the multi-layer circuit will appear, protruding through or into the voids 80. The multi-layer opto-electric circuit 73 may be constructed in such a manner as to make these access points correspond to predetermined locations for easy alignment with embedded or surface-mounted opto-electronic components 40, for example. Where it is desirable to exchange signals between one or more circuit assemblies, void areas 80 may also be created along the edges to permit termination with fiber optic board edge connectors 82. An example of an assembled multi-layer opto-electric circuit 73 is shown in FIG. 10C.

Figure 11A:
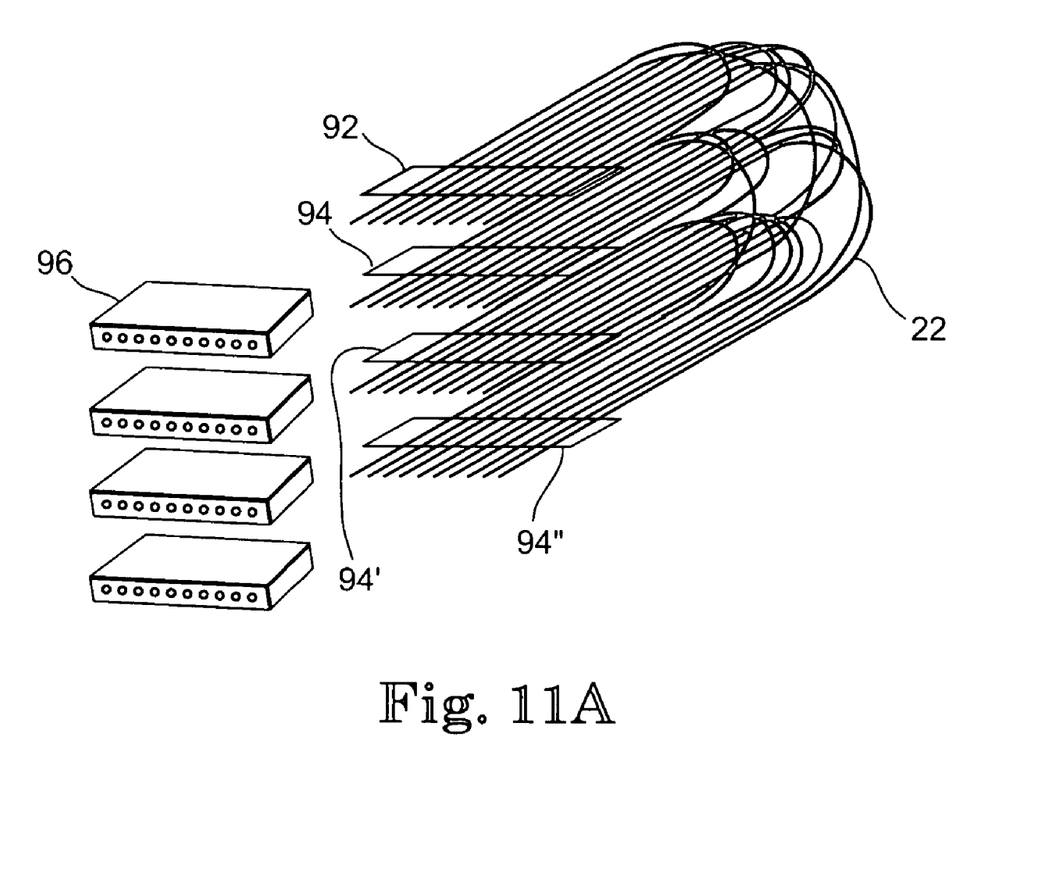
FIGS. 11A–11B schematically illustrate one embodiment of a three-dimensional optical circuit according to the invention.
Figure 11B:
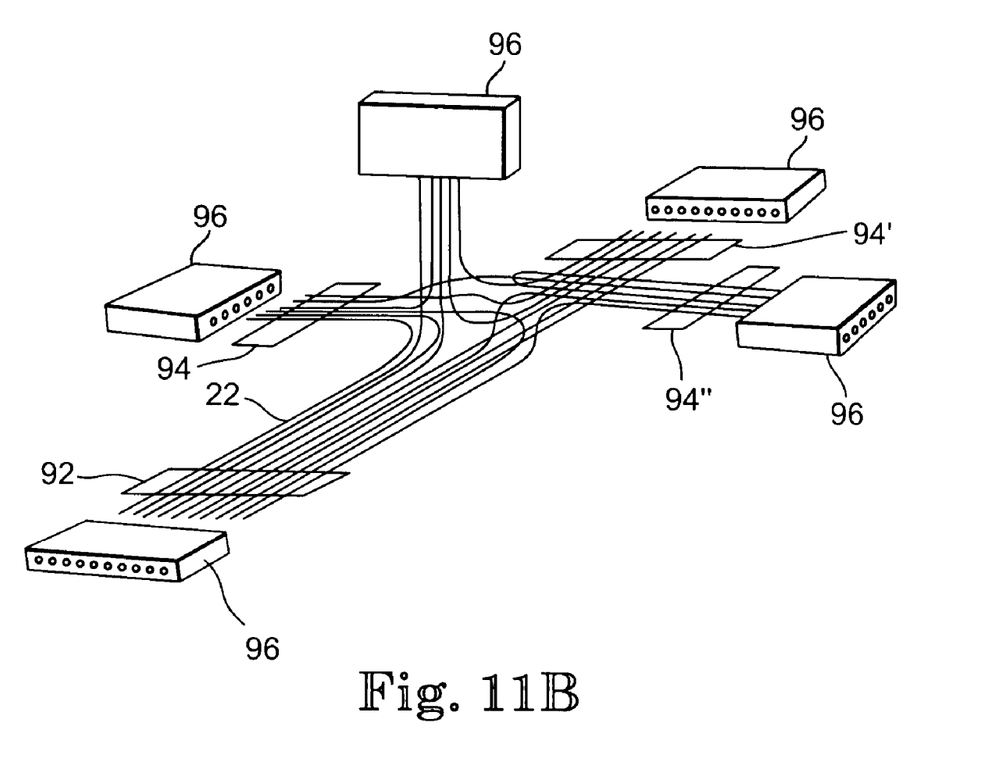

FIGS. 11A–11B illustrate another embodiment of a multi-layer (three dimensional) circuit according to the invention. In the embodiment of FIGS. 11A–11B, one end of each optical fiber 22 is attached at a first location 92 where specific alignment or termination of the optical fibers 22 is desired. Attachment can be achieved with, for example, adhesive bonding, mechanical clamping or some combination of these or similar attachments. Lengths of each of the optical fibers extend from the first attachment locations 92 to second locations 94, 94' 94" in space where an alignment or termination of the opposite end of each optical fibers 22 is desired, and the optical fibers 22 are attached at the second locations 94, 94', 94". The optical fibers 22 are free along their lengths between the first and second attachment locations 92, 94. In one embodiment according to the invention, the fiber ends are attached at the first and second attachment locations 92, 94 at a pitch that is useful for termination with a connector 96.

By constructing an optical circuit where the fibers 22 are attached at their ends and free along their lengths, a number of benefits are obtained. First, the fibers 22 of the optical circuit are not subject to or influenced by the material properties of any substrate. Second, fiber crossover can be avoided, thereby reducing potential micro-bending stresses. Third, the resulting optical circuit can be quite flexible, because just the mechanical properties of the fibers 22 can affect flexure, leading to an optical circuit that is conformable to its environment. If the optical circuit is constructed with high strength and durable fibers, the circuit may be capable of conforming to surfaces with curvatures as small as a 0.25 inch radius.

Optical circuits according to the invention fabricated in this manner may be three dimensional, resulting in the ability to make extremely compact designs or designs with unique or complex shapes. For example, an optical circuit according to the invention may be constructed to provide a circuit pattern commonly described as a "shuffle" or "perfect shuffle". A shuffle can be fabricated such that it is not constrained to two dimensions, but rather is terminated to an array of various connections in a three dimensional volume (such as illustrated in FIGS. 11A and 11B).

As is understood from the above description, the multi-layer optical circuits of the present invention can readily permit routing of optical fibers between different layers so that, for example, fibers from one layer can be transposed to another layer for termination in a single connector. Fibers from one connector on a first layer can be routed to a second layer prior to termination into an adjacent connector, thus providing versatility in skew compensation. Multi-layer optical circuits according to the present invention may be used to create custom configurations for applications where compact circuit designs are required to flex with system components, such as in personal digital assistants (PDAs) cell phones, and laptop computers, to name a few. Multi-layer optical circuits fabricated according to the present invention can minimize mechanical bending stresses imparted to the optical fibers in compact designs. For example, the fibers can be routed such that the fibers are free to equilibrate bending forces when the layers are folded, rotated or otherwise moved relative to each other. Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An optical circuit comprising:
   a first optical circuit layer disposed on a first substrate portion;
   a second optical circuit layer disposed on a second substrate portion;
   wherein the first and second substrate portions are physically separate from each other an optical fiber of the first and second optical circuit layers extending continuously between the first and second optical circuit layers; and a third optical circuit disposed on a third substrate portion, wherein an optical fiber of the third optical circuit layer extends continuously between the third optical circuit layer and at least one of the first and second optical circuit layers.

2. The optical circuit of claim 1, wherein the first and second substrate portions are disposed in a stacked orientation.

3. The optical circuit of claim 1, wherein the first and second substrate portions are connected to each other by a substrate connection portion extending between the first and second substrate portions.

4. The optical circuit of claim 1, wherein the first and second substrate portions are separated from each other by an open window portion, and wherein the optical fiber extends over the window portion.

5. A method of forming a multi-layer optical circuit comprising:

patterning optical fibers to create a first layer of the optical circuit on a first substrate;

patterning optical fibers to create a second layer of the optical circuit on a second substrate, wherein the first and second substrates are separated from each other, and wherein at least one optical fiber is integral with and extends between the first layer and the second layer;

patterning optical fibers to create a third layer of the optical circuit on a third substrate, and wherein at least one optical fiber extends from at least one of the first layer of the optical circuit on the first substrate and the second layer of the optical circuit on the second substrate; and positioning the first, second and third substrates in a layered arrangement.

6. The method of claim 5, wherein positioning the first, second and third substrates in a layered manner comprises laying the second substrate on the first substrate.

7. The method of claim 5, wherein positioning the first, second and third substrates in a layered manner comprises rotating the second substrate relative to the first substrate.

8. The method of claim 5, wherein positioning the first, second and third substrates in a layered manner comprises twisting the second substrate relative to the first substrate.

9. The method of claim 5, wherein positioning the first and second substrates in a layered arrangement occurs subsequent to patterning optical fibers to create a first layer of the optical circuit on a first substrate and patterning optical fibers to create a second layer of the optical circuit on a second substrate.

10. The method of claim 5, wherein the patterning further comprises securing the optical fibers to the first and second substrates adjacent ends of the optical fibers.

11. The method of claim 5, wherein the first substrate and the second substrate are connected to each other.

12. The method of claim 11, wherein the first and second substrates are connected to each other by a substrate strip extending between the first and second substrates.

13. A method of forming a multi-layer optical circuit comprising:

patterning optical fibers to create a first layer of the optical circuit on a first substrate;

patterning optical fibers to create a second layer of the optical circuit on a second substrate, wherein the first and second substrates are separated from each other, and wherein at least one optical fiber is integral with and extends between the first layer and the second layer;

positioning the first and second substrates in a coplanar orientation prior to patterning optical fibers to create a first layer of the optical circuit on the first substrate and patterning optical fibers to create a second layer of the optical circuit on the second substrate, wherein positioning the first and second substrates in a layered arrangement comprises positioning the first and second substrates in a bi-planar orientation subsequent to patterning optical fibers to create a first layer of the optical circuit on the first substrate and patterning optical fibers to create a second layer of the optical circuit on the second substrate.

14. A method of forming a multi-layer optical circuit comprising:

patterning first and second optical circuits on first and second substrates, wherein said first and second circuits include a common optical fiber;

positioning said first and second substrates in a stacked arrangement, wherein said positioning comprises a substrate manipulation selected from the group consisting of bending, folding, twisting and rotating at least one of the first and second substrates relative to the other; and patterning a third optical circuit on a third substrate, wherein said third circuit includes a common optical fiber with one of said first and second optical circuits.

15. The method of claim 14, wherein the patterning further comprises patterning said first and second optical circuits in a common plane.

16. The method of claim 14, wherein the positioning further comprises a substrate manipulation selected from the group consisting of bending, folding, twisting and rotating the third substrate relative to at least one of the first and second substrates.

17. The method of claim 14, further comprising embedding at least one of said first and second circuits onto its respective substrate.

18. The method of claim 14, wherein said first and second circuits include a plurality of common optical fibers, and further comprising orienting the common optical fibers in a plane parallel to at least one of the substrates.

19. The method of claim 14, wherein said first and second circuits include a plurality of common optical fibers, and further comprising orienting the common optical fibers in a plane perpendicular to at least one of the substrates.

20. The method of claim 14, further comprising providing a crease region between the substrates.

21. The method of claim 20, further comprising orienting the common optical fiber in said crease region.

22. The method of claim 14, further comprising providing a window region between the substrates.

23. The method of claim 22, further comprising orienting the common optical fiber in said window region.

* * * * *